Sept. 19, 1950  J. T. CARLETON  2,523,094
IGNITRON INVERTER
Filed Dec. 11, 1948

WITNESSES:
Robert C. Baird
Nw. C. Groome

INVENTOR
James T. Carleton.
BY
S. A. Strickled
ATTORNEY

Patented Sept. 19, 1950

2,523,094

UNITED STATES PATENT OFFICE 2,523,094

IGNITRON INVERTER

James T. Carleton, Pittsburgh, Pa., assignor to Westinghouse Electric Corporation, East Pittsburgh, Pa., a corporation of Pennsylvania Application December 11, 1948, Serial No. 64,777

4 Claims. (Cl. 321—36)

My invention relates to a vapor-electric device, and particularly to a self-exciting system for a vapor-electric device acting to supply an alternating-current load from a direct-current source.

In the operation of vapor-electric converters operating to supply alternating-current circuit loads, it has heretofore been customary either to supply an outside means to establish the frequency of the load current or to provide an outside means for establishing the frequency of the exciting current.

According to my invention, I provide a self-exciting system which will furnish a stable alternating-current output potential without the use of any external frequency stabilizing means.

The system includes a pair or a plurality of pairs of alternately-conducting valves of the make-alive type having in addition to the make-alive electrodes, grid-like auxiliary electrodes serving the double purpose of arc control and the supply of exciting current to the exciting system, the primary winding of the exciting system is connected at a mid-point to the positive terminal of the source of exciting current through a reactor, terminal connections to the grid-like electrodes permit the flow of exciting current and a capacitor across the winding tunes the circuit to any desired frequency. Energy for the make-alive circuits is derived from the oscillating circuit by a secondary winding inductively coupled to the primary winding.

It is accordingly an object of my invention to provide a self-exciting inverter.

It is a further object of my invention to provide a self-exciting system having a stable frequency output.

Figure 1:
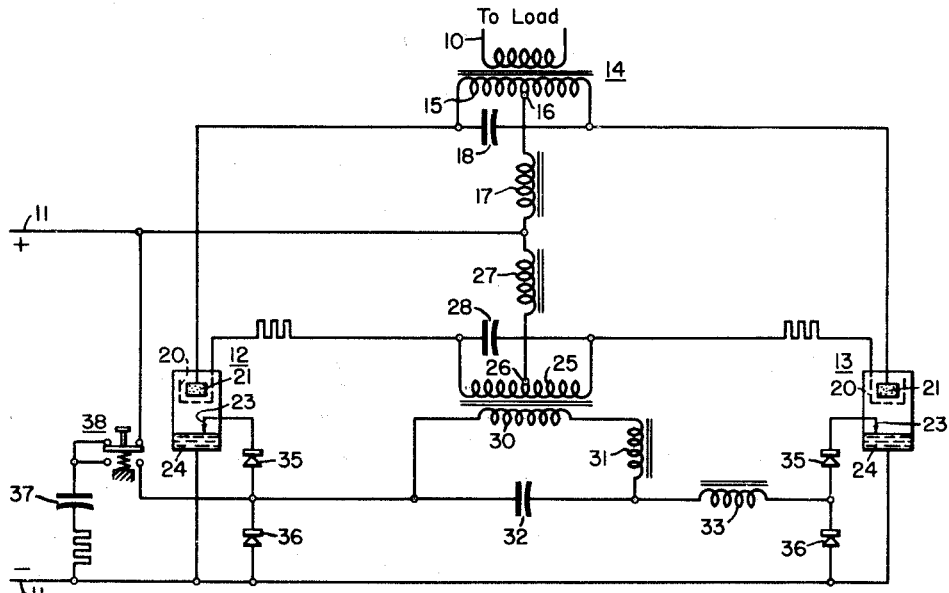
Figure 2:
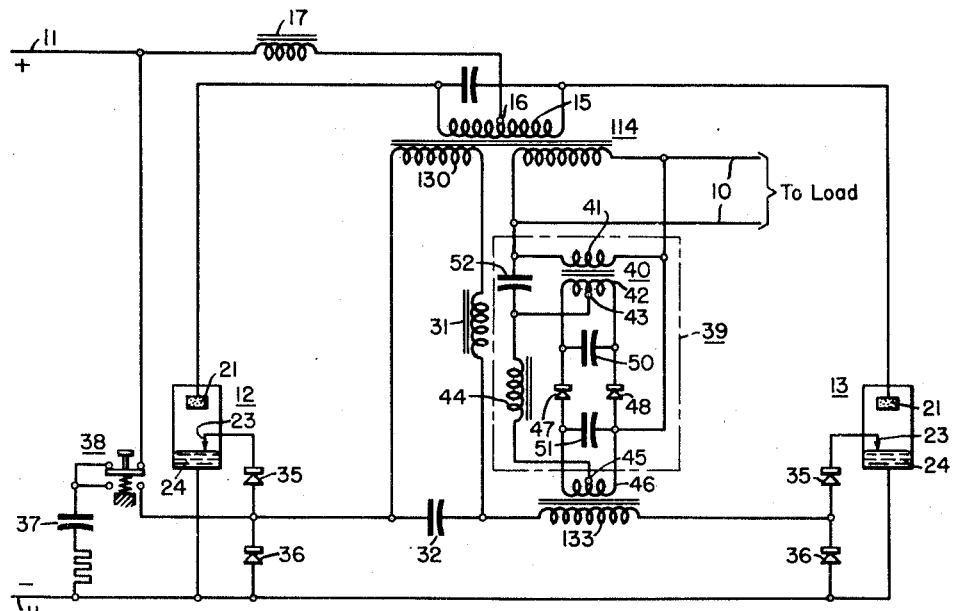

Other objects and advantages of my invention will be apparent from the following detailed description taken in conjunction with the accompanying drawing, in which:

Figure 1 is a schematic illustration of a simple embodiment of my invention; and Fig. 2 is a similar illustration of a preferred embodiment of my invention.

In the illustrated embodiment of my invention, an alternating-current load circuit 10 is supplied with power from a direct-current supply circuit 11 by means of a vapor-electric converter comprising at least a pair of alternately-conducting vapor-electric valves 12 and 13 preferably of the ignitron type. The alternating-current circuit 10 and the direct-current circuit 11 are connected together by means of a transformer 14 and the flow of current through the transformer 14 is determined by means of the alternately-conducting electron valves 12 and 13 connected to the terminals of the primary winding 15 of the transformer 14.

The positive side of the direct-current supply circuit 11 is connected to an intermediate terminal 16 of the primary winding 15 through a suitable reactance device 17 while a commutating capacitor 18 is connected across the terminals of the primary winding 15 of the transformer 14. The reactance 17 and the capacitor 18 tune the transformer circuit substantially to the frequency desired in the load circuit 10.

The exciting circuit for each of the vapor-electric devices 12 and 14 comprises an auxiliary grid-like electrode 20 adjacent the main anodes 21 of the devices and a make-alive or igniter electrode 23 in contact with the liquid pool-type cathode 24.

Connected between the grids 20 of the alternately-conducting vapor-electric valves 12 and 13 is a winding 25 having a mid-tap 26 connected by means of a reactor 27 to the positive terminal of a source of unidirectional control potential, which may conveniently be the direct-current circuit 11. Associated with the winding 25 and energized therefrom is a capacitor 28 which, together with the reactor 27, tunes the circuit to the output frequency desired.

Inductively associated with the first-mentioned winding 25 is a secondary winding 30 the terminals of which are connected by means of an impedance 31 to supply a charge to a firing capacitor 32. One side of the firing capacitor 32 is connected to the make-alive electrode 23 of one of the valves, as 12, while the other side is connected to the firing electrode 23 of the alternately-conducting valve 13. A wave-distorting device, such as a saturable reactor 33, is connected in series with the firing capacitor 32 to control the wave shape of the potential output or discharge current of the firing capacitor 32.

Proper application of the firing potential of capacitor 32 to the electrodes 23 is obtained by means of a suitable polarity-responsive network, herein illustrated as a unidirectional conductor 35 in series with each of the make-alive electrodes 23 and a second unidirectional conductor 36 conducting in an opposite direction in shunt around the make-alive electrode 23 and the serially-connected unidirectional conductor 35. The circuit is completed by connecting each of the cathodes 24 of the alternately-conducting valves 12 and 13 to the negative terminal of the unidirectional supply circuit 11.

In order to place the system in operation, an auxiliary firing circuit is provided in the form of a capacitor 37 normally connected across the direct-current supply circuit 11 by means of a switch which is operative to disconnect the capacitor 37 from the positive side of circuit 11 and to connect the capacitor 37 to one of the make-alive electrodes 23 for supplying the initial firing impulse.

In the operation of my system, the direct-current circuit 11 supplies potential to both of the windings 15 of the load transformer 14 and the winding 25 of the control transformer. Since there is nothing to establish a polarity, both of the anodes 21 will be positive as well as both of the control grids 20. Then by operating the starting switch 38, one of the make-alive electrodes 23 will be energized causing the vapor-electric valve 12 to carry current which in turn polarizes all of the windings both of the load transformer 14 and of the control transformer, and the flow of current thereto automatically establishes excitation to the alternately-conducting valves 12 and 13 as well as controls the frequency of the load circuit 10.

In a preferred embodiment according to my invention the grid-like electrodes 20 are dispensed with and the firing capacitor 32 is energized from a winding 130 at the main transformer 114.

It has been found that such self-excited inverters have a tendency to vary slightly in frequency. In the modification of Fig. 2, I have shown a discriminator circuit 39 for biasing the impulsing system dependently on the frequency so that any variation from the desired frequency will be self-corrected. The frequency-responsive discriminator circuit comprises a transformer 40, the primary 41 of which is connected across the output terminals of the load transformer 114, the secondary winding 42 having a mid-tap 43 connected by means of a reactor 44 to the intermediate tap 45 of a biasing winding 46 on the saturable reactor 133 in the firing circuit.

The terminals of the secondary winding 42 are connected to the respective terminals of winding 46 by means of connections including unidirectional conductors 47 and 48.

The biasing voltage is stabilized by a capacitor 50 connected across the terminals of the secondary winding 42 of the stabilizing transformer 40 and making a resonant circuit therewith. Likewise, the biasing winding 46 is stabilized by a capacitor 51 connected across the terminals and forming a resonant circuit therewith. One side of the winding 46 is connected to one terminal of the primary winding 42 and the intermediate terminal 43 of the secondary winding 42 of the stabilizing transformer 40 is connected to the opposite terminal of winding 41 by a capacitor 52. As the frequency varies from the predetermined value, a current will be set up in the biasing winding 46 either to increase or decrease the magnetic flux in the core of reactor 133 causing the impulse to occur at a time to bring the frequency back to the normal output frequency.

While I have shown preferred embodiments of my invention and described my invention to the best of my present knowledge, I desire it to be understood that many changes and modifications can be made therein without departing from the true spirit of my invention or the scope of the appended claims.

I claim as my invention:

1. A vapor-electric converter comprising a pair of alternately-conducting electron valves, each of said valves including a pair of cooperating main electrodes, a grid and a make-alive electrode, a winding having end terminals connected to the alternate grid electrodes and an intermediate terminal, a source of direct current, a reactor connected between one terminal of said source and said intermediate terminal, a capacitor connected across the end terminals of said winding, a secondary winding inductively coupled with said first-mentioned winding, a firing capacitor connected to be charged from said secondary winding, connections from the capacitor to the respective make-alive electrodes and means responsive to the charge on the firing capacitor for controlling the flow of make-alive current from said firing capacitor to said make-alive electrodes.

2. A control system for a vapor-electric converter supplying electric energy from a unidirectional source to an alternating load circuit comprising a pair of alternately-conducting vapor-electric valves, each of said valves including a pair of cooperating main electrodes, a control electrode and an exciting electrode, a winding connected between the control electrodes of the respective valves, an intermediate tap in said winding, a reactor connected between said tap and one terminal of the direct-current circuit, a capacitor connected across said winding, a secondary winding inductively associated with said first-mentioned winding, a capacitor connected to be charged from said secondary winding, polarity-responsive means connecting said capacitor to said exciting electrodes and wave-distorting means connected in series-circuit relation with said capacitor.

3. A control system for a vapor-electric converter operating to supply an alternating-current circuit from a direct-current supply circuit comprising a pair of alternately-conducting vapor-electric valves each valve comprising a main anode on a pool-type cathode, a control electrode intermediate between the anode and cathode, and an igniter in contact with the pool-type cathode, the winding having terminals connected to the control electrodes of the alternately-conducting valves, an intermediate terminal inside said winding, a reactor connecting said intermediate terminal to one side of the direct-current circuit, a capacitor connected across said winding to provide an oscillatory circuit of predetermined frequency, a secondary winding inductively coupled with said first-mentioned winding, a capacitor connected to be charged from said secondary winding, wave-distorting means connected in series-circuit relation with the capacitor, connections from one side of said capacitor to one of said make-alive electrodes and connections from the other side of said capacitor and said wave-distorting means to the make-alive electrode of said alternately-conducting device, and polarity-responsive means for determining which of said make-alive electrodes is energized from said capacitor.

4. A control system for a vapor-electric converter operating to supply an alternating-current circuit from a direct-current supply circuit comprising a pair of alternately-conducting vapor-electric valves each valve comprising a main anode on a pool-type cathode, a control electrode intermediate between the anode and cathode, and an igniter in contact with the pool-type cathode, the winding having terminals connected to the control electrodes of the alternately-conducting valves, an intermediate terminal inside said winding, a reactor connecting said intermediate terminal to one side of the direct-current circuit, a capacitor connected across said winding to provide an oscillatory circuit of predetermined frequency, a secondary winding inductively coupled with said first-mentioned winding, a capacitor connected to be charged from said secondary winding, wave-distorting means connected in series-circuit relation with the capacitor, connections from one side of said capacitor to one of said make-alive electrodes and connections from the other side of said capacitor and said wave-distorting means to the make-alive electrode of said alternately-conducting device, polarity-responsive means for determining which of said make-alive electrodes is energized from said capacitor, a biasing winding associated with said wave-distorting device and frequency-responsive means for varying the instance of saturation of said wave-distorting device.

JAMES T. CARLETON.

No references cited.